(12) United States Patent
Newgent et al.

(10) Patent No.: US 10,766,734 B2
(45) Date of Patent: Sep. 8, 2020

(54) FULL FRAME BRAKE FOR COILING MACHINERY

(71) Applicants: James Newgent, Magnolia, TX (US); Tammy Newgent, Magnolia, TX (US)

(72) Inventors: James Newgent, Magnolia, TX (US); Tammy Newgent, Magnolia, TX (US)

(*) Notice: Subject to any disclaimer, the term of this patent is extended or adjusted under 35 U.S.C. 154(b) by 365 days.

(21) Appl. No.: 15/994,651

(22) Filed: May 31, 2018

(65) Prior Publication Data

US 2019/0367318 A1    Dec. 5, 2019

(51) Int. Cl.
*B65H 59/04*    (2006.01)
*B65H 49/32*    (2006.01)
*B65H 54/52*    (2006.01)

(52) U.S. Cl.
CPC ......... *B65H 59/043* (2013.01); *B65H 49/325* (2013.01); *B65H 54/52* (2013.01); *B65H 2701/36* (2013.01)

(58) Field of Classification Search
CPC .... B65H 59/043; B65H 49/325; B65H 54/52; B65H 2701/36; B65H 49/32; B60T 1/12; B60T 1/14; F16D 63/008
USPC ...................................... 188/4 R, 5
See application file for complete search history.

(56) References Cited

U.S. PATENT DOCUMENTS

| | | | | |
|---|---|---|---|---|
| 1,521,705 A * | 1/1925 | Norman, Jr. | ............... | B60T 1/14 188/5 |
| 2,871,986 A * | 2/1959 | Polovitch | ................... | B60T 1/14 188/5 |
| 2,886,139 A * | 5/1959 | Wilson | ...................... | B60T 1/14 188/5 |
| 2,922,494 A * | 1/1960 | Clark, Jr. | ............ | B60B 33/0089 188/5 |
| 2,972,452 A * | 2/1961 | Aumann | ................ | B65H 59/04 242/421.9 |
| 3,132,820 A * | 5/1964 | Toll | ........................ | B21C 47/04 242/532.5 |
| 3,379,392 A * | 4/1968 | Garnett | ................... | B60T 13/04 242/399.1 |
| 3,554,328 A * | 1/1971 | Jones | ..................... | B62B 5/049 188/5 |
| 3,715,015 A * | 2/1973 | Morris | .................... | B62B 5/049 188/5 |
| 3,746,113 A * | 7/1973 | Tidwell | ..................... | B60T 1/14 180/224 |
| 3,770,071 A * | 11/1973 | Opel | ...................... | B62D 37/00 180/15 |

(Continued)

*Primary Examiner* — William A. Rivera
(74) *Attorney, Agent, or Firm* — Law Office of Jeff Williams PLLC; J. Oliver Williams (57) ABSTRACT

The frame brake assembly includes a sleeve, a piston, a brake, and a retracting device. The piston translates within the sleeve between an upper first position and a lower second position. A brake is coupled to a lower portion of the piston beneath the sleeve. As the piston moves between positions, the brake moves in a corresponding manner. In the second position, the brake is lowered into contact with the ground. The retracting device is used to automatically return the piston and brake to the first position. When installed on the coiling machine, the frame brake assembly is coupled to the frame of the coiling machine and is in selective engagement with a pair of spool arms. Rotation of the spool arms induces translation from the first position to the second position in the frame brake assembly.

19 Claims, 6 Drawing Sheets

(56) References Cited

U.S. PATENT DOCUMENTS

| | | | | |
|---|---|---|---|---|
| 4,194,702 | A * | 3/1980 | Ploeg | B65H 49/32 |
| | | | | 242/394.1 |
| 5,267,749 | A * | 12/1993 | Hughes | B60T 1/14 |
| | | | | 188/5 |
| 6,595,332 | B1 * | 7/2003 | Pennington | A47B 53/02 |
| | | | | 188/31 |
| 7,040,460 | B1 * | 5/2006 | Sherrill | B25H 5/00 |
| | | | | 188/19 |
| 8,827,047 | B2 * | 9/2014 | Baker | B60T 1/14 |
| | | | | 188/5 |
| 2010/0187782 | A1 * | 7/2010 | Facey | B62B 5/0093 |
| | | | | 280/30 |

* cited by examiner

FULL FRAME BRAKE FOR COILING MACHINERY

BACKGROUND

1. Field of the Invention

The present application relates to coiling machinery for the winding and unwinding of coil reels, and more particularly to a full frame brake for stabilizing the coiling machinery during use.

2. Description of Related Art

Metallic cables and wires are used in many types of applications within industry. These cables are stored typically on a reel or spool because these cables and wires are very long and the act of wrapping them around a cylindrical spool is a fairly efficient way to store, transport, and use them without concern for bending or creasing the cables. Coiling machinery is used to assist in the winding and unwinding of these spools of cable. Depending on the size of the cable and spool, these spools can be extremely heavy. The coiling machinery therefore has to be built to be very sturdy and stable. This machinery typically includes a means of elevating the spool off the floor and a means of counting the amount of cable unwound or wound. Spools rotate about a shaft. As these spools can be very large, the counter can slide on a track across the width of the coil machine.

A disadvantage of these coil machines is that they are not inherently stable, especially when dealing with large spools. The machines are made from a strong rigid frame which is supported on the ground with a plurality of wheels or casters to help make them portable. A considerable amount of force may be exerted upon the frame and spool when winding or unwinding a spool. To stabilize the machine and prevent the wheels from rolling during operation, two small foot brakes are typically included adjacent the caster wheels. These are activated by pushing down with the foot and engaging a small pad to the floor. Under load, these small brakes may fail and struggle at best to keep the machine stationary. Another disadvantage of these small brakes is that they have to be manually applied by a worker. Workers can forget to apply them or fail to fully engage them causing the machine to wander. This may lead to injury, damaged goods, and lost time.

Although strides have been made to provide improved safety with regards to the handling of large spools and coil machinery, shortcomings remain. It is desired that a new brake system be realized where the brake is applied automatically and over an increased area across the frame so as to increase stability.

SUMMARY OF THE INVENTION

It is an object of the present application to provide a full frame brake for coiling machinery that is configured to be automatically applied as the spool is lifted off the ground. The brake is configured to engage with the spool carrying arms which are designed to pivot about an axis on the frame. The frame extends perpendicularly across the axis of rotation. As the spool is lifted, the other end of the arms drop downward. The full frame brake is configured to use this dropping motion of the arm to initiate a brake.

It is a further object of the present application that the brake is configured to lift a portion of the frame of the coil machine off the ground to remove at least one wheel from touching the ground. The frame brake is securely attached to the coil machinery and can be integral with the coil machinery as a singular unit or may be a separate assembly therefrom.

A further object of the present application is the ability of the brake to automatically release when the spool is lowered. In one embodiment, the frame brake is not coupled to the pivoting frame arm.

The method of using the assembly is simplified in that a user merely has to load a spool in communication with the arms and then lift the spool off the ground to facilitate its ability to rotate on a shaft. The lifting of the spool off the ground initiates the activation of the brake. As spools are different sizes, the initial starting position of the frame arms between spools can vary. Therefore the brake is configured to be adjustable so as to ensure that pre-engagement of the brake does not occur with large spools having a central axis of rotation higher off the ground than a small spool, and that engagement of the brake does actually occur with small spools where the central axis is closer to the ground. As the lift height can change, the frame brake is configured to adjust with the expected size of spool to ensure proper function.

Ultimately the invention may take many embodiments but features the ability to create safety first and foremost, provide for the automatic engagement and release of the brake in response to the loading and unloading of a spool, be fully adjustable to accommodate operation with various sized spools, and extend across the width of the frame arms. In this way, this assembly overcomes the disadvantages inherent in the prior art.

The more important features of the brake assembly have thus been outlined in order that the more detailed description that follows may be better understood and to ensure that the present contribution to the art is appreciated. Additional features of the brake assembly will be described hereinafter and will form the subject matter of the claims that follow.

Many objects of the present assembly will appear from the following description and appended claims, reference being made to the accompanying drawings forming a part of this specification wherein like reference characters designate corresponding parts in the several views.

Before explaining at least one embodiment of the assembly in detail, it is to be understood that the assembly is not limited in its application to the details of construction and the arrangements of the components set forth in the following description or illustrated in the drawings. The assembly is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and assemblies for carrying out the various purposes of the present assembly. It is important, therefore, that the claims be regarded as including such equivalent constructions insofar as they do not depart from the spirit and scope of the present assembly.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

While the assembly and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the assembly described herein may be oriented in any desired direction.

The assembly and method in accordance with the present application overcomes one or more of the above-discussed problems commonly associated with conventional means of brakes on coiling machinery discussed previously. In particular, the frame brake assembly is configured to operate with coiling machinery used in the process of winding or unwinding spools of cable or wire. The frame brake assembly is configured to automatically apply a brake to support the frame of the coiling machinery as the spool is lifted off the ground. The brake is automatically removed or released with the lowering of the spool. The brake location is adjustable to compensate for different sized spool diameters. The brake also extends the full width between the spool arms to increase the surface area contact with the ground. These and other unique features of the assembly are discussed below and illustrated in the accompanying drawings.

The assembly and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The assembly and method of the present application is illustrated in the associated drawings. The frame brake assembly includes a sleeve, a piston, a brake, and a retracting device. The piston translates within the sleeve between an upper first position and a lower second position. A brake is coupled to a lower portion of the piston beneath the sleeve. As the piston moves between positions, the brake moves in a corresponding manner. In the second position, the brake is lowered into contact with the ground. The retracting device is used to automatically return the piston and brake to the first position. When installed on the coil machine, the frame brake assembly is coupled to the frame of the coil machine and is in selective engagement with a pair of spool arms. Rotation of the spool arms induces translation from the first position to the second position in the frame brake assembly. Additional features and functions of the device are illustrated and discussed below.

Referring now to the Figures wherein like reference characters identify corresponding or similar elements in form and function throughout the several views. The following Figures describe the assembly of the present application and its associated features. With reference now to the Figures, an embodiment of the modular observation assembly and method of use are herein described. It should be noted that the articles "a", "an", and "the", as used in this specification, include plural referents unless the content clearly dictates otherwise.

Figure 1:
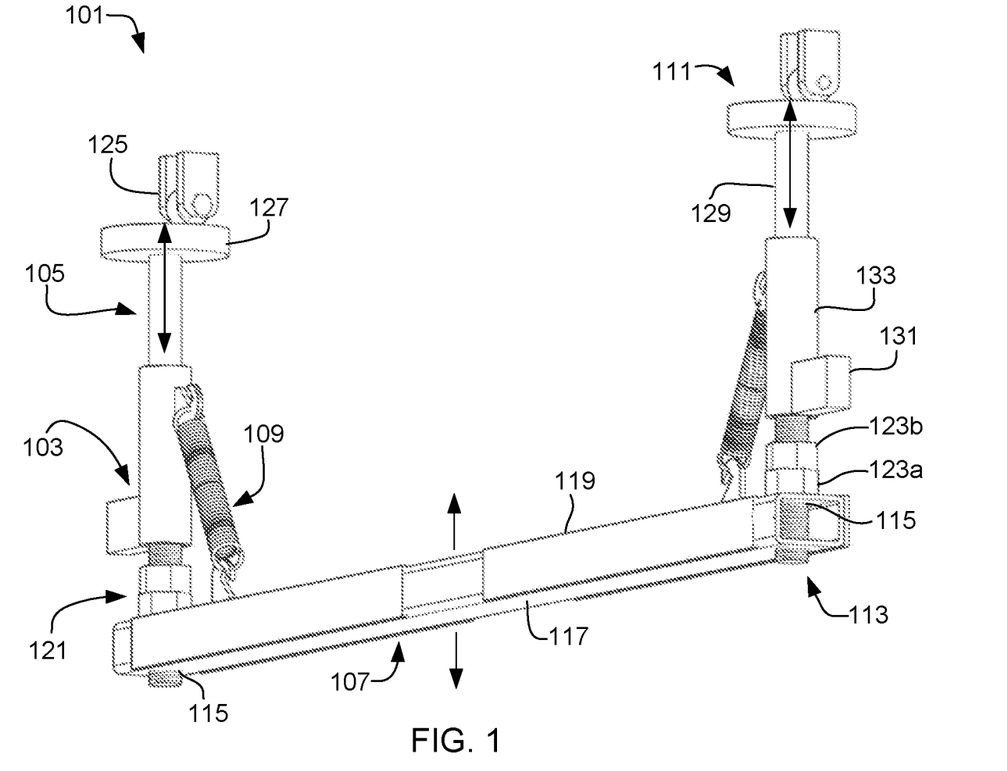
FIG. 1 is a perspective view of a frame brake assembly according to an embodiment of the present application.

Referring now to FIG. 1 in the drawings, a perspective view of a frame brake assembly according to the present application is illustrated. Frame brake assembly 101 includes a sleeve 103, a piston 105, a brake 107, and a retracting device 109. Frame brake assembly 101 is configured to couple to a frame of a coiling machine used to wind and/or unwind large spools of cable and wire. The spools are lifted off the ground to permit free rotation. Under the load of holding the spools, a large amount of force is exerted on the frame of the coiling machine such that the machine may become unstable. Assembly 101 is configured to apply a brake 107 to the ground automatically when the spool is elevated and supported by the frame of the coiling machine.

Assembly 101 is seen in FIG. 1 as consisting of a mirrored set of parts. Each set of parts operates similarly to the other side. Discussion will be focused on describing one set of parts knowing that these same parts are equally functional and shown on the other side of brake 107. Sleeve 103 is a rigidly set and secured device relative to the frame of the coiling machine. The other parts of assembly 101 are designed to move in relation to sleeve 103. Piston 105 is configured to translate within sleeve 103. Piston 105 includes a first end 111 and a second end 113, wherein each end 111/113 are located on opposite ends of sleeve 103. Sleeve 103 remains between these ends 111/113 as piston 105 operates between a first position and a second position. The first position refers to an elevated position of the piston relative to sleeve 103, such that the first end 111 is raised to a distal location above sleeve 103. The second position refers to a lowered position of the piston relative to sleeve 103, wherein the first end 111 is brought close to or adjacent to an upper portion of the sleeve 103. Piston 105 operates between the first position and the second position.

Brake 107 is coupled to piston 105 adjacent the second end. Brake 107 moves in a corresponding manner to that of piston 105, as movement of piston 105 induces movement of brake 107. In the second position, brake 107 is translated to a more distant location relative to sleeve 103. Brake 107 is configured to be adjustable relative to piston 105 in that the specific location at which brake 107 is secured to piston 105 may change as desired. To facilitate this adjustability, piston 105 includes a threaded exterior surface at the second end. Brake 107 includes an aperture 115 to accept the threaded surface of the second end. Piston 105 is free to rotate within sleeve 103 and rotation of piston 105 acts to rotate the threaded connection with brake 107 so as to raise or lower brake 107 across piston 105 depending on the direction of rotation of piston 105. Brake 107 is configured to contact the ground along a bottom surface 117 when in the second position. Brake 107 may include a pad 119 to protect both brake 107 and the ground surface as well as increase grip with the ground surface.

Assembly 101 may further include an adjustment member 121 in communication with piston 105 and brake 107. Member 121 is configured to selectively secure brake 107 to piston 105 at the selected location on piston 105. As seen in FIG. 1, adjustment member 121 is depicted as a set of nuts that operate on the same threaded surface of piston 105 as brake 107. The directions of each nut 123a/123b may have the same thread direction or opposite thread directions. By tightening nuts 123a/123b together and against brake 107, brake 107 is prevented from moving along piston 105. Nuts 123a/123b also act to restrict the free rotation of piston 105.

Retracting device 109 is coupled between sleeve 103 and brake 107 and is designed to automatically reset the position of the brake and piston to the first position. A force is accepted by piston 105 at first end 111. This force acts to induce the linear motion through sleeve 103 from the first position to the second position. As the force is withdrawn, retracting device 109 is configured to lift brake 107 and piston 105 back to the first position. This is made possible as sleeve 103 is stationary. Retracting device 109 may be a spring, band, or other type of elastic, flexible, or stretchable device/material. When in the first position, device 109 experiences minimal to no load. When in the second position, device 109 is in tension. It is this tension force that returns brake 107 and piston 105 to the first position.

Frame brake assembly 101 may further include a roller 125. Roller 125 has a wheel or roller ball that rolls along a top plate 127 of piston 105. Plate 127 has a diameter larger than a shaft 129 of piston 105. Roller 125 is configured to be coupled to the coiling machinery and assist in transferring movement of the coiling machinery into movement of piston 105. Roller 125 ensures a smooth contact with plate 127 and can move perpendicular to the direction of translation of piston 105. Roller 125 is in contact with plate 127 when piston 105 is not in the first position. When piston 105 is in the first position, roller 125 is optionally in contact thereof.

Figure 2:
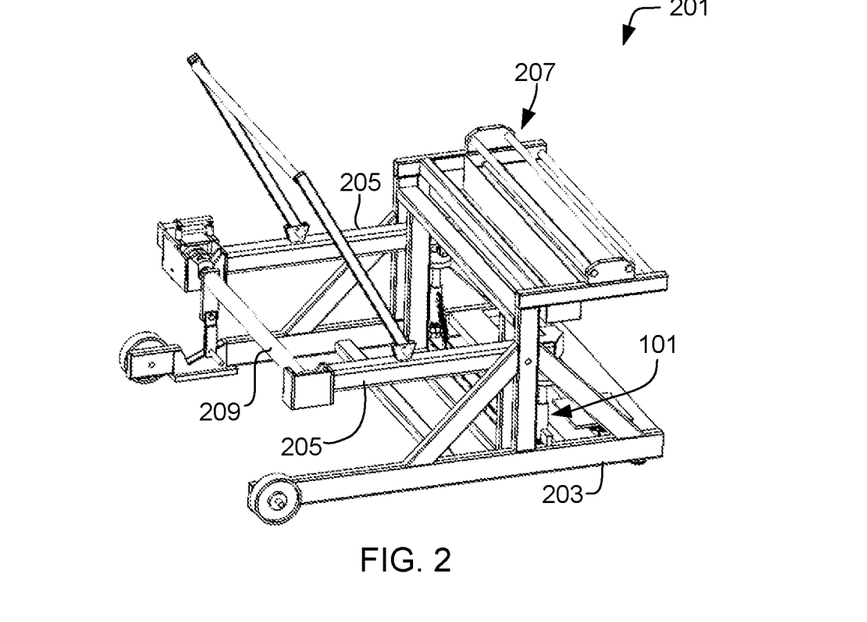
FIG. 2 is an upper perspective view of the frame brake assembly of FIG. 1 installed on a coiling machine.

Referring now also to FIGS. 2-8, various views are provided to illustrate frame brake assembly 101 within a coiling machine to form coiling machine 201. Coiling machine 201 includes frame brake assembly 101, a frame 203, and a pair of spool arms 205. In FIG. 2 an upper perspective view of machine 201 is illustrated whereas in FIG. 3 a lower perspective view of machine 201 is provided.

Figure 3:
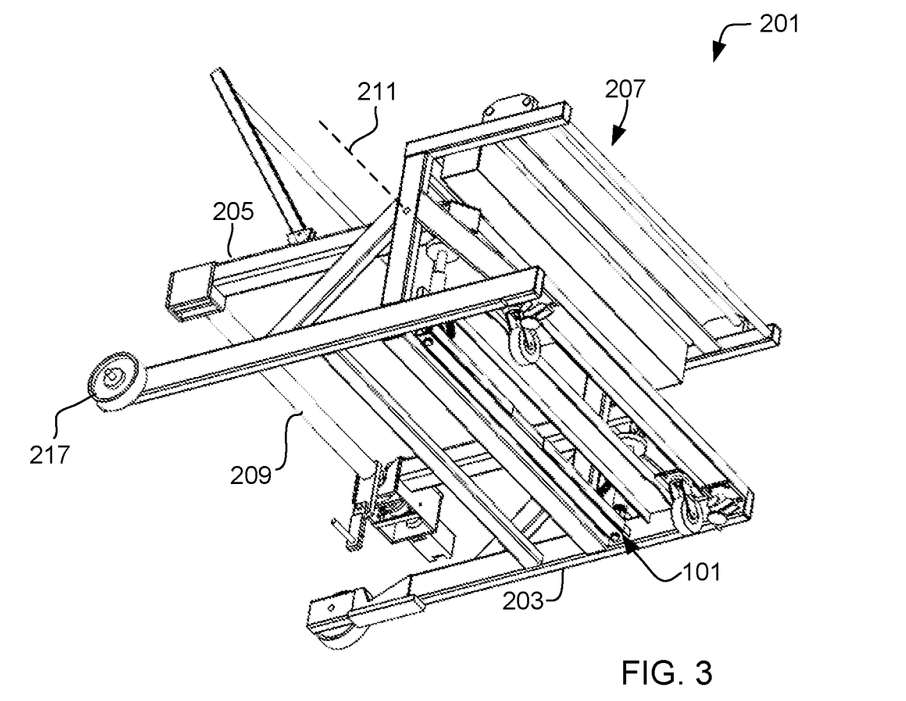
FIG. 3 is a lower perspective view of the coiling machine of FIG. 2.

In operation, machine 201 is configured to lift a spool (not shown for clarity), whether full of cable or not, so as to either unwind the spool or to wind the spool. When cable is removed from or added to the spool, it is measured in linear length. A counter (not shown for clarity) is used to track the linear amount of cable. The counter would be run along a track 207 where it is free to translate side to side. The spool rests on a shaft 209. Shaft 209 is passed through the center of the spool and then located within arms 205. A motor (i.e. electric or hydraulic) is used to lift arms 205 and correspondingly the spool as well, such that the spool is free to rotate and is not in contact with the ground surface.

Figure 4:
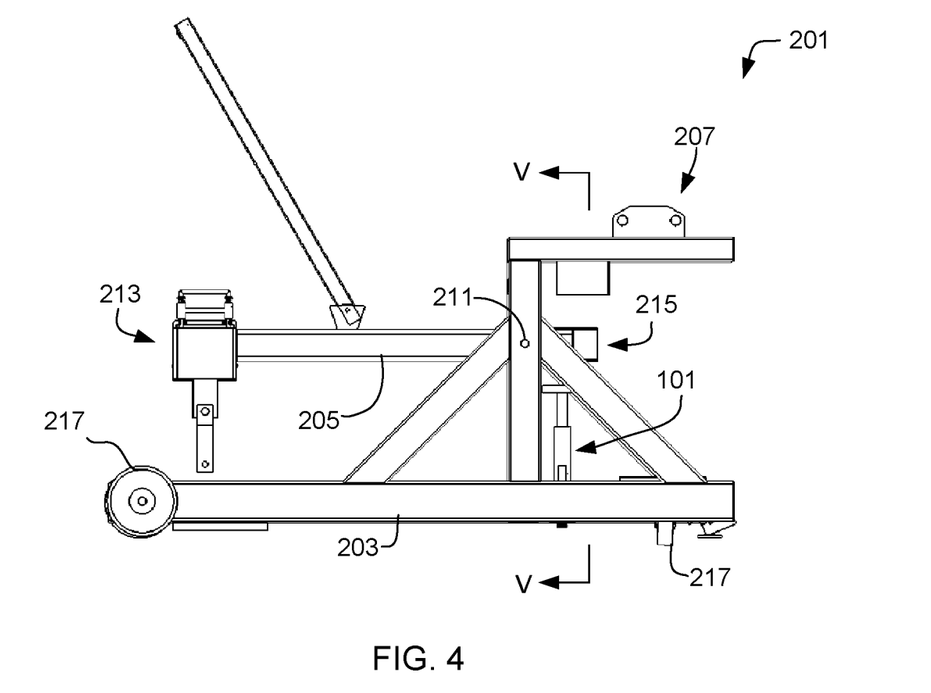
FIG. 4 is a side view of the coiling machine of FIGS. 2 and 3.

In FIG. 4 a side view of machine 201 is illustrated. Assembly 101 is more clearly seen in relation to frame 203 and arms 205. Arms 205 are pivotally coupled to frame 203 and are configured to rotate about an axis 211. Arms 205 have a first end 213 and a second end 215, such that the first end 213 and the second end 215 are on opposing sides of the axis 211. This causes the movements of the ends 213/215 to be mirrored opposite one another as arms 205 are rotated about axis 211. As first end 213 raised above the ground surface, second end 215 lowers moving closer to the ground surface.

Machine 201 is configured to be a portable machine that is easily transportable. Machine 201 includes a plurality of wheels 217 which may take the form of typical non swivel wheels and casters which swivel. Both types are depicted in the Figures with machine 201.

Figure 5:
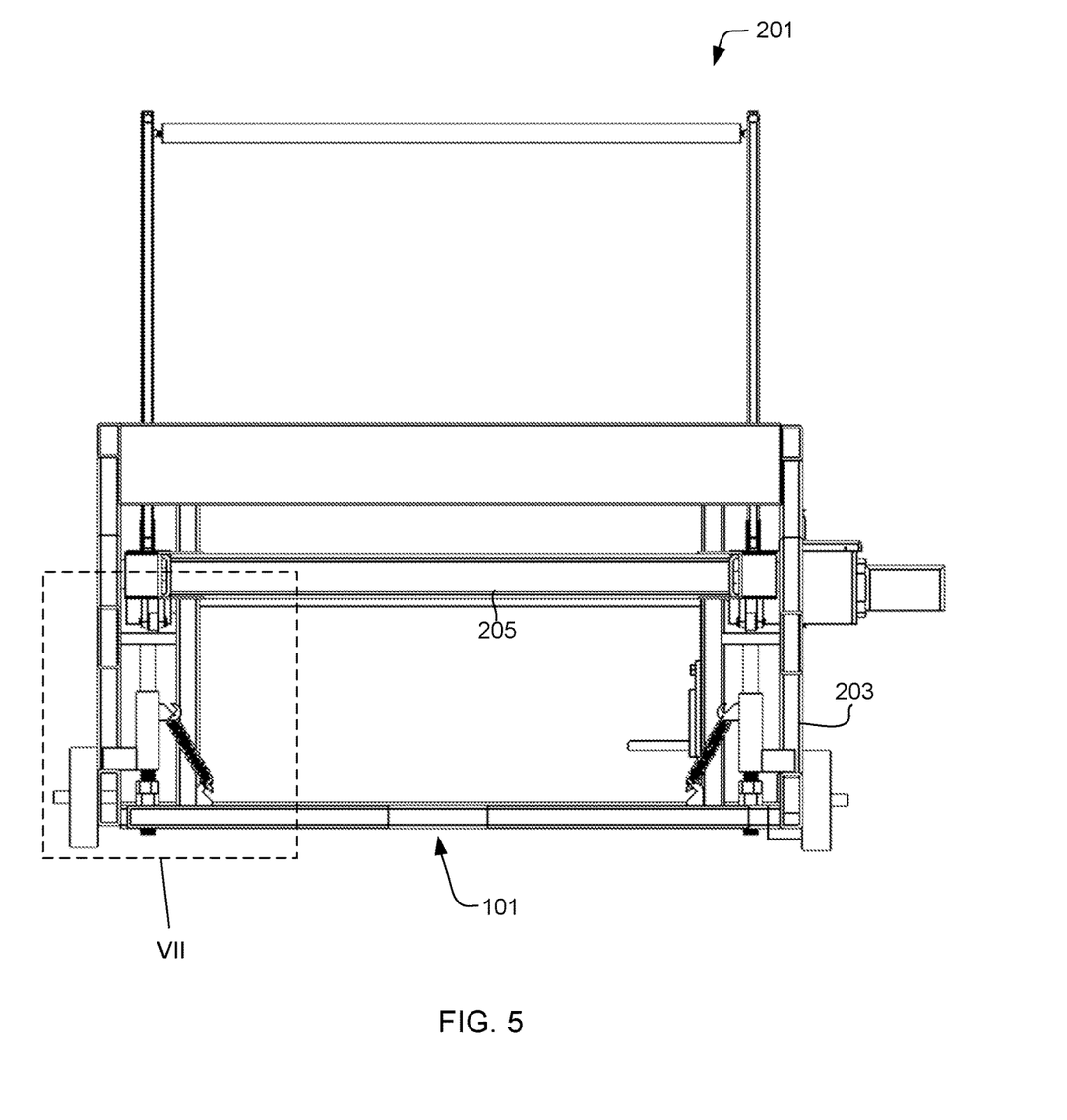
FIG. 5 is a front section view of the coiling machine of FIG. 4.
Figure 6:
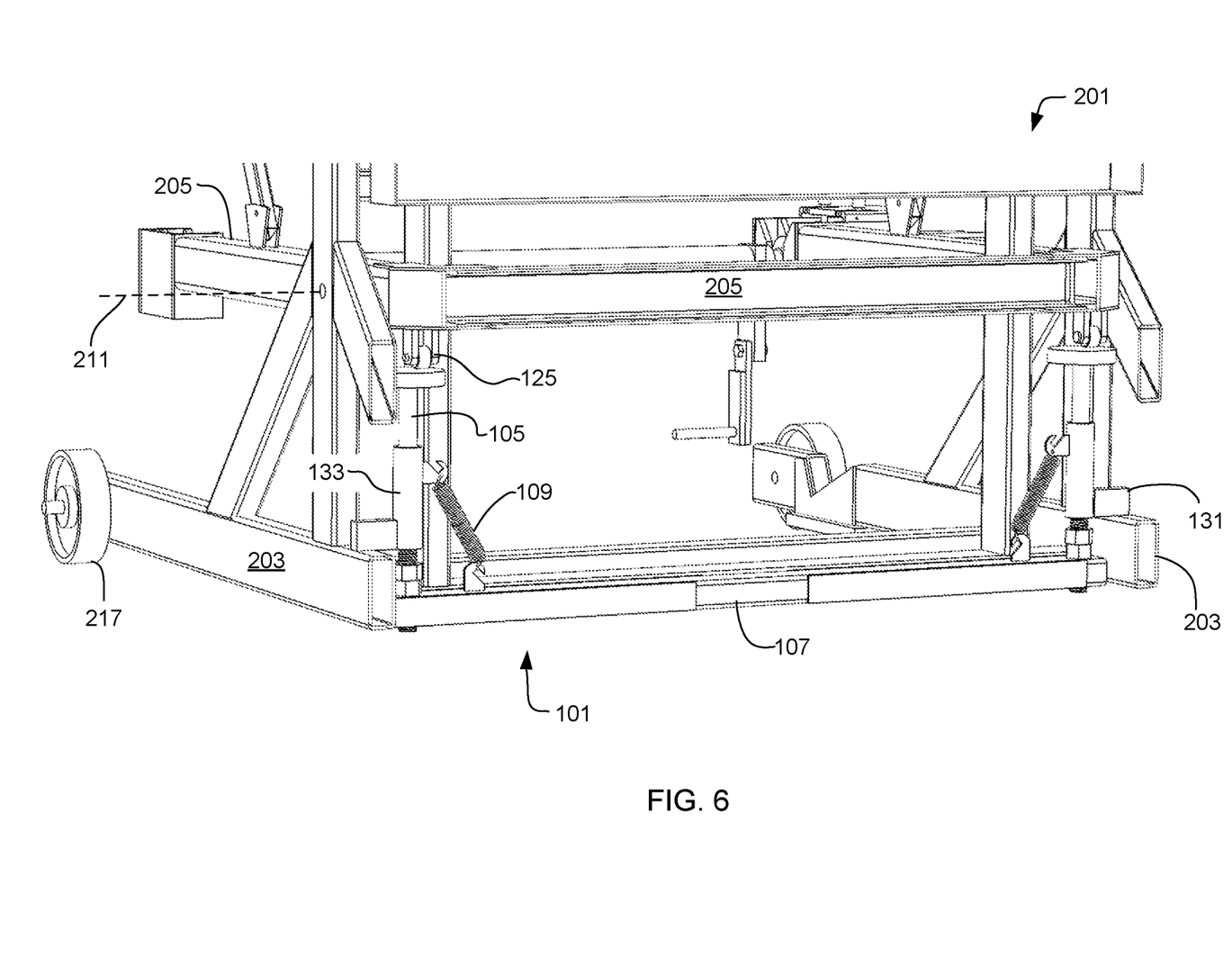
FIG. 6 is a perspective view of the coil machine of FIG. 5.
Figure 7:
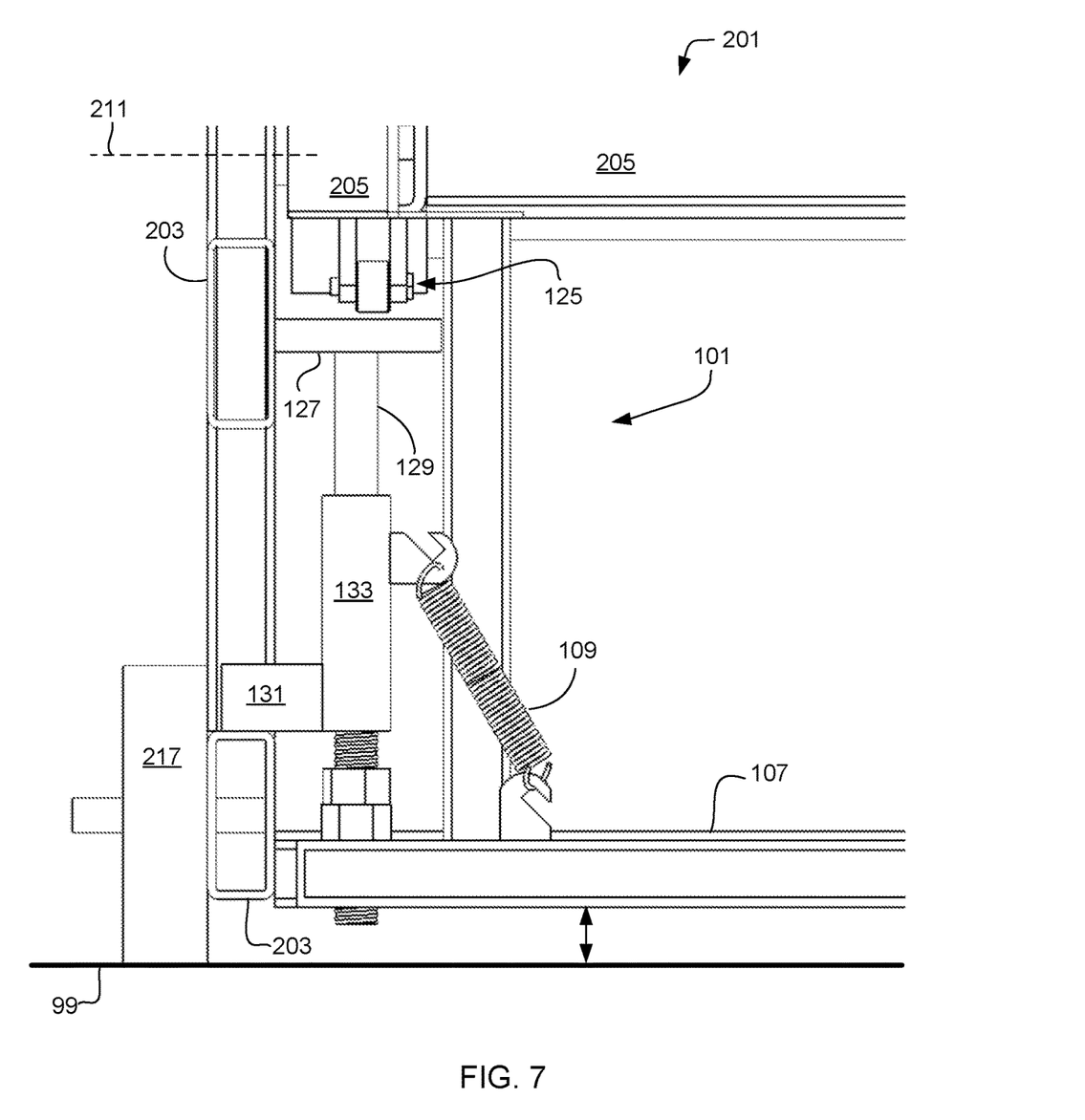
FIG. 7 is an enlarged front view of the brake assembly as seen in FIG. 5.
Figure 8:
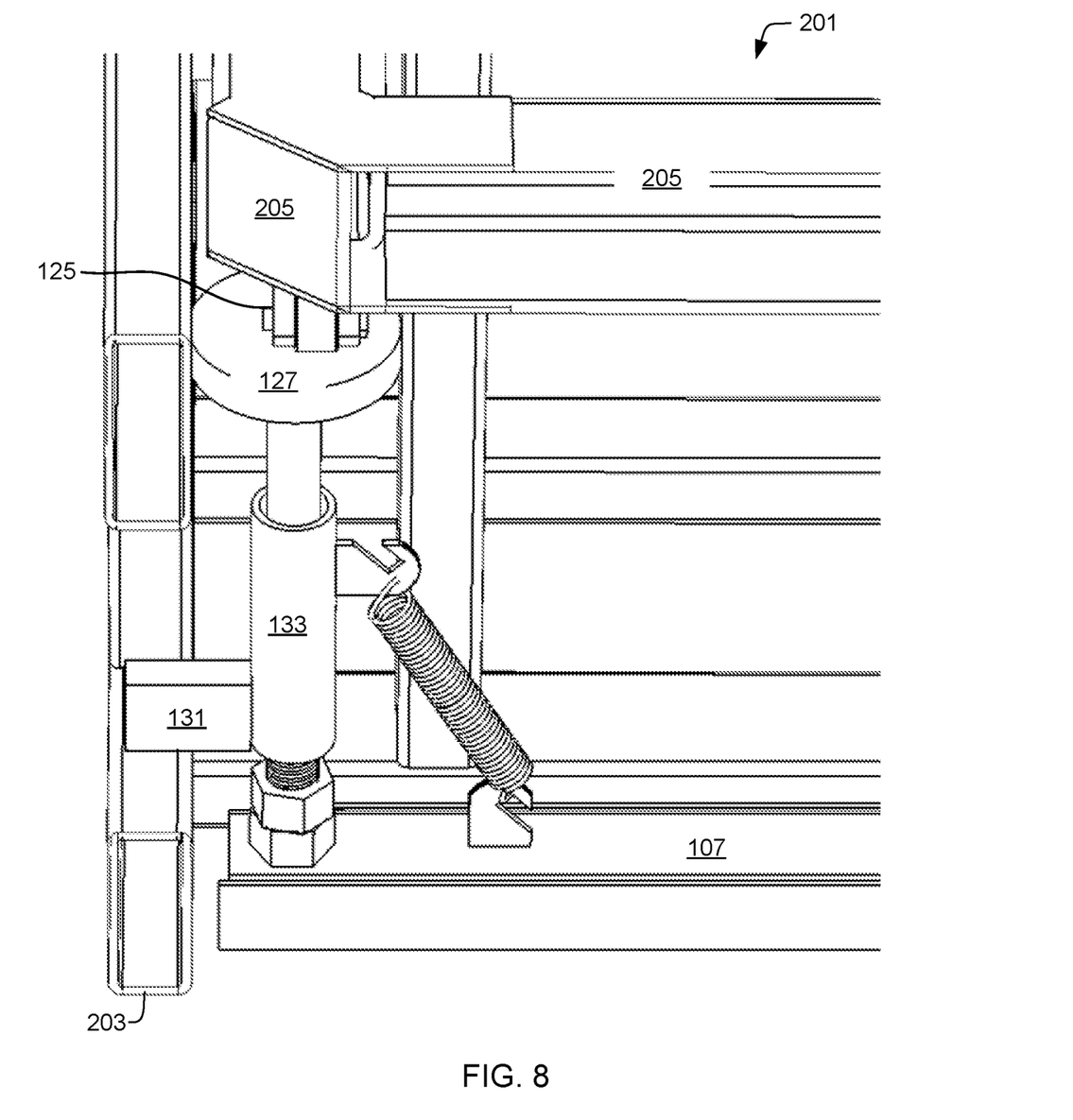
FIG. 8 is an upper perspective view of the brake assembly of FIG. 7.

Referring in particular with FIG. 5, a section view of machine 201 is illustrated to more easily see how assembly 101 is engaged with frame 203. FIG. 6 provides a perspective view of the view of FIG. 5 to help assist with context. The various parts of assembly 101 are partially labeled for convenience. As noted previously, sleeve 103 is coupled to frame 205. As seen in FIG. 7 with an enlarged view of a single side of assembly 101, sleeve 103 includes a tab 131 coupled to a cylinder 133. Tab 131 is coupled to frame 203 and is used to support cylinder 133 in a relatively vertical alignment. Piston 105 translates within cylinder 133. Sleeve 103 is affixed to and does not move in relation to frame 203. FIG. 8 provides an elevated perspective view of the view of FIG. 7.

As seen in FIG. 7, roller 125 of assembly 101 is coupled to a bottom surface of arms 205 approximate the second end 215. In this view, assembly 101 is in the first position with piston 105 and brake 107 raised relative to sleeve 103. Assembly 101 is located opposite the first end 213, adjacent to second end 215, wherein assembly 101 and first end 213 are on opposite sides of axis 211. Arms 205 are depicted in a lowered position, such that roller 125 is disconnected from, or does not contact, piston 105 or plate 127. With arms 205 lowered where the spool would sit, second end 215 is raised. It is understood that arms 205 may be lowered more than this depending on the size of the spool to be used. When lifted at first end 213, roller 125 would contact and press down upon plate 127 pushing piston 105 and brake 107 downward, thereby placing device 109 in tension. When this is done, brake 107 is lowered to the second position.

In the first position, brake 107 is raised above ground surface 99. When lowered, brake 107 passes below frame 203 and contacts ground surface 99. Machine 201 is configured that when first end 213 is raised, the amount of travel of arms 205 is sufficient to yield enough linear travel of piston 103 that brake 107 passes below the bottom of a wheel 217. This allows a portion of wheels 217 to be lifted off the ground. The weight and force of the spool and wire is transferred to the brake 107 and ground surface 99.

Some key features to note of assembly 101 in relation with machine 201 is that brake 107 extends the full width between arms 205. This greatly increases the surface area of brake 107 in contact with ground surface 99. This also helps to distribute the weight of the spool across a greater area. Additionally, brake 107 is automatically applied or moved to the second position with the lifting of the spool. This prevents a worker from forgetting to apply a brake. Furthermore, the brake is automatically released as a result of device 109 when the spool is lowered. Another feature is that brake 107 is fully adjustable on piston 105. The precise location of arms 205 and its level of travel are dependent upon the spool size. Adjustment of brake location on piston 105 allows assembly 101 to work with varied sized spools.

The current application has many advantages over the prior art. The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A frame brake assembly, comprising:
   a sleeve;
   a piston having a first end and a second end and is configured to translate within the sleeve, the first end and the second end located on opposing sides of the sleeve, the piston operating between a first position and a second position;
   a brake coupled to the piston and is configured to move with the movement of the piston; and
   a retracting device coupled between the sleeve and the brake and is configured to automatically reset the position of the brake and piston to the first position.

2. The assembly of claim 1, wherein the first end and the second end of the piston are on opposing sides of the sleeve.

3. The assembly of claim 1, wherein retracting device is a spring.

4. The assembly of claim 1, further comprising:
   an adjustment member in communication with the piston, the piston and the brake in threaded communication so that the location of the brake can selectively vary on the piston, the adjustment member configured to secure the brake to a position on the piston adjacent the second end.

5. The assembly of claim 4, wherein the adjustment member is a set of nuts.

6. The assembly of claim 4, wherein adjustment of the brake along the piston occurs through rotation of the piston.

7. The assembly of claim 1, wherein the brake includes a pad coupled to one or more surfaces of the brake, the pad configured to increase friction and prevent marring when the brake contacts another surface.

8. The assembly of claim 1, further comprising:
   a roller above the piston, the roller configured to selectively contact the first end and induce translation of the piston through the sleeve into the second position.

9. The assembly of claim 1, wherein the retracting member is under tension when the piston is in the second position.

10. A coiling machine, comprising:
    a frame;
    a pair of spool arms pivotally coupled to the frame, the pair of spool arms configured to pivot about an axis, the pair of spool arms having a first end and a second end such that the first end and the second end are on opposing sides of the axis and move in opposite directions from each other when the pair of spool arms are rotated; and
    a frame brake assembly in selective communication with the second end of the pair of spool arms, the frame brake assembly being coupled to the frame and includes a brake that operates between a first position and a second position, the frame brake assembly configured to automatically apply the brake as the first end is elevated thereby locating the brake in the second position, the frame brake assembly configured to automatically release the brake as the first end is lowered thereby locating the brake in the first position.

11. The machine of claim 10, wherein the frame includes a plurality of wheels to facilitate transportation of the frame.

12. The machine of claim 11, wherein at least one wheel is separated from a ground surface when the brake is in the second position.

13. The machine of claim 10, wherein the second end is disconnected from the frame brake assembly when the pair of spool arms are lowered.

14. The machine of claim 10, wherein the brake extends across the width of the pair of spool arms.

15. The machine of claim 10, wherein the location of the brake relative to the frame is adjustable.

16. The machine of claim 10, wherein the second positon of the brake places the brake into contact with a ground surface.

17. The machine of claim 10, wherein the brake extends below the frame when in the second position.

18. The machine of claim 10, wherein the brake lifts the frame partially off a ground surface when in the second position.

19. The machine of claim 10, wherein rotation of the pair of spool arms induces linear motion of the frame brake assembly.

* * * * *